Patented Aug. 9, 1927.

1,638,121

UNITED STATES PATENT OFFICE.

KARL JELLINCK AND WILHELM CHRIST, OF OFFENBACH-ON-THE-MAIN, GERMANY, ASSIGNORS TO I. G. FARBENINDUSTRIE AKTIENGESELLSCHAFT, OF FRANKFURT-ON-THE-MAIN, GERMANY.

PROCESS OF PRODUCING ICE COLORS ON COTTON.

No Drawing. Application filed January 15, 1925, Serial No. 2,603, and in Germany February 25, 1924.

When developing ice colors with non-acid, that is neutral or with soda alkaline diazo solutions there is the danger of a progressive decomposition of the diazo compound, produced by the alkaline solution, which together with the padded material is put into the dye-bath, making it alkaline with caustic alkali, so that unsatisfactory feeble or troubled or nonuniform dyeings are liable to be obtained. This inconvenience comes especially to light in dyeing in a standing bath and in the case of tetrazo compounds, so that it was hitherto difficult to obtain according to this method with diazo solutions uniform lots certain to be satisfactory.

Now we have found that the injurious action of the caustic alkali upon the diazo compound can be overcome by adding to the diazo-bath substances that will neutralize the alkali of the padding solution without acidifying the bath, such as for example an alkaline bicarbonate or a suitable metal salt (such as magnesium sulfate or zinc chloride) or both together.

According to this method the diazo-baths remain free of products of decomposition, giving uniform and clear dyeings.

The following examples illustrate the invention.

Example 1.

The cotton goods are padded with a solution, containing 10 gr. of the para-chloroanilide of 2.3-oxynaphthoic acid, 15 cc. of Turkey red oil, 15 cc. of caustic soda solution of 34° Bé. and 10 cc. of formaldehyde of 30% standard in the liter, well wrung out and developed in a diazo solution of meta-xylidin. The diazo solution is prepared as follows: 2.5 gr. of meta-xylidin are mixed with 5 cc. of hydrochloric acid of 20° Bé. and dissolved in 25 cc. of hot water. After cooling down the solution is poured while stirring into a solution, cooled with ice, of 1.5 gr. of sodium nitrite of 98% standard. The diazotation is finished in 10 minutes. Then soda is added until the solution begins to show an alkaline reaction and then 5 gr. of sodium bicarbonate are added.

In this manner bluish red shades are obtained. The dyeing-bath remains completely clear.

Example 2.

The cotton goods are padded with a solution, containing 12 gr. of the anilide of 2.3-oxynaphthoic acid, 15 cc. of Turkey red oil, 18 cc. of caustic soda solution of 34° Bé. and 12 cc. of formaldehyde, well wrung out and developed with a diazo solution of 4.4'-diaminodiphenylamine. This diazo solution is prepared as follows: 4 gr. of 4.4'-diamidodiphenylamine are dissolved in 20 cc. of hot water. After cooling down 50 cc. of cold water and 20 gr. of ice and 10 cc. of hydrochloric acid of 20° Bé. are added. Then slowly while stirring continuously a solution of 3 gr. of sodium nitrite in 5 cc. of water is poured in. After 10 minutes the diazo-solution is neutralized with chalk and 5 gr. of magnesium sulfate are added.

Dark black shades are obtained. The dye-bath is neutral after the development.

Example 3.

The cotton goods are padded with a solution, containing 3 gr. of the alpha-naphthalide of 2.3-oxynaphthoic acid, 6 cc. of Turkey red oil, 9 cc. of caustic soda solution of 34° Bé. and 3 cc. of formaldehyde of 30% standard in the liter, and well desiccated. Then the cotton is developed in portions of 50 kg. in 1000 liters of a diazo solution of dianisidine. For the first 50 kg. of padded cotton the following diazo solution may be prepared: 1.2 kg. of dianisidine are dissolved with 1.05 liters of hydrochloric acid of 20° Bé. in 25 liters of boiling water. After cooling down 15 kg. of ice, 10 liters of water and .95 liter of hydrochloric acid of 20° Bé. are added. Into this solution slowly while stirring continuously .7 kg. of sodium nitrite of 98% standard, dissolved in 1 liter of water are poured. The diazo solution is neutralized with chalk, made up to 1000 liters and .8 kg. of zinc chloride and 10 kg. of sodium bicarbonate are added.

For each following lot of 50 kg. of cotton goods an addition to the bath is to be made, prepared as follows: .45 kg. of dianisidine are diazotized in the above described manner and neutralized. To this diazo solution .2 kg. of zinc chloride and 2 kg. of sodium bicarbonate are added.

In this manner dark blue shades are obtained. The lots, dyed one after the other, are uniform and the dye-bath remains in a good state.

Now what we claim and desire to secure by Letters Patent, is the following:

1. In the process of producing ice colors on cotton, the improvement which consists in using non-acid diazo solutions and, for the purpose of avoiding lean or nonuniform dyeings, adding to these diazo solutions substances that will neutralize the alkali of the padding solution without acidifying the bath.

2. Cotton materials dyed according to claim 1.

In testimony, that we claim the foregoing as our invention, we have signed our names, this 31st day of December 1924.

DIPL. ING. KARL JELLINCK.
DR. WILHELM CHRIST.

In this manner dark blue shades are obtained. The lots, dyed one after the other, are uniform and the dye-bath remains in a good state.

Now what we claim and desire to secure by Letters Patent, is the following:

1. In the process of producing ice colors on cotton, the improvement which consists in using non-acid diazo solutions and, for the purpose of avoiding lean or nonuniform dyeings, adding to these diazo solutions substances that will neutralize the alkali of the padding solution without acidifying the bath.

2. Cotton materials dyed according to claim 1.

In testimony, that we claim the foregoing as our invention, we have signed our names, this 31st day of December 1924.

DIPL. ING. KARL JELLINCK.
DR. WILHELM CHRIST.

CERTIFICATE OF CORRECTION.

Patent No. 1,638,121.  Granted August 9, 1927, to

KARL JELLINEK and WILHELM CHRIST.

It is hereby certified that the name of the first mentioned patentee of the above numbered patent was erroneously written and printed as "Karl Jellinck" whereas said name should have been written and printed as "Karl Jellinek"; and that the said Letters Patent should be read with this correction therein that the same may conform to the record of the case in the Patent Office.

Signed and sealed this 6th day of September, A. D. 1927.

M. J. Moore,
Seal.  Acting Commissioner of Patents.

CERTIFICATE OF CORRECTION.

Patent No. 1,638,121.                           Granted August 9, 1927, to

KARL JELLINEK and WILHELM CHRIST.

It is hereby certified that the name of the first mentioned patentee of the above numbered patent was erroneously written and printed as "Karl Jellinck" whereas said name should have been written and printed as "Karl Jellinek"; and that the said Letters Patent should be read with this correction therein that the same may conform to the record of the case in the Patent Office.

Signed and sealed this 6th day of September, A. D. 1927.

Seal.

M. J. Moore,
Acting Commissioner of Patents.